(12) United States Patent
Fan et al.

(10) Patent No.: US 11,350,073 B2
(45) Date of Patent: May 31, 2022

(54) DISPARITY IMAGE STITCHING AND VISUALIZATION METHOD BASED ON MULTIPLE PAIRS OF BINOCULAR CAMERAS

(71) Applicant: DALIAN UNIVERSITY OF TECHNOLOGY, Liaoning (CN)

(72) Inventors: Xin Fan, Liaoning (CN); Risheng Liu, Liaoning (CN); Zhuoxiao Li, Liaoning (CN); Wei Zhong, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/283,119

(22) PCT Filed: Mar. 5, 2020

(86) PCT No.: PCT/CN2020/077957
§ 371 (c)(1),
(2) Date: Apr. 6, 2021

(87) PCT Pub. No.: WO2021/120407
PCT Pub. Date: Jun. 24, 2021

(65) Prior Publication Data
US 2022/0046218 A1    Feb. 10, 2022

(30) Foreign Application Priority Data
Dec. 17, 2019    (CN) .......................... 201911304513.0

(51) Int. Cl.
*H04N 13/156* (2018.01)
*H04N 13/239* (2018.01)
(Continued)

(52) U.S. Cl.
CPC ............ *H04N 13/156* (2018.05); *G06T 7/11* (2017.01); *G06T 7/85* (2017.01); *H04N 13/15* (2018.05);
(Continued)

(58) Field of Classification Search
CPC .... H04N 13/156; H04N 13/15; H04N 13/239; H04N 13/246; G06T 7/11; G06T 7/85;
(Continued)

(56) References Cited

U.S. PATENT DOCUMENTS 10,027,949 B2 *   7/2018   Kato ..................... H04N 13/243
10,373,362 B2 *   8/2019   Fine ................... H04N 5/23238
(Continued)

FOREIGN PATENT DOCUMENTS

| CN | 107767339 A | 3/2018 |
|----|-------------|--------|
| CN | 108470324 A | 8/2018 |
| CN | 109978760 A | 7/2019 |

*Primary Examiner* — Susan E. Hodges
(74) *Attorney, Agent, or Firm* — Muncy, Geissler, Olds & Lowe, P.C.

(57) ABSTRACT

The present invention discloses a disparity image stitching and visualization method based on multiple pairs of binocular cameras. A calibration algorithm is used to solve the positional relationship between binocular cameras, and the prior information is used to solve a homography matrix between images; internal parameters and external parameters of the cameras are used to perform camera coordinate system transformation of depth images; the graph cut algorithm has high time complexity and depends on the number of nodes in a graph; the present invention divides the images into layers, and solutions are obtained layer by layer and iterated; then the homography matrix is used to perform image coordinate system transformation of the depth images, and a stitching seam is synthesized to realize seamless panoramic depth image stitching; and finally, depth (Continued)

information of a disparity image is superimposed on a visible light image.

10 Claims, 1 Drawing Sheet

(51) Int. Cl.
  *H04N 13/246* (2018.01)
  *G06T 7/11* (2017.01)
  *G06T 7/80* (2017.01)
  *H04N 13/15* (2018.01)
(52) U.S. Cl.
  CPC ......... *H04N 13/239* (2018.05); *H04N 13/246* (2018.05); *G06T 2207/20021* (2013.01); *G06T 2207/20221* (2013.01)
(58) Field of Classification Search
  CPC . G06T 2207/20021; G06T 2207/20221; G06T 3/4038
  USPC .......................................................... 348/47
  See application file for complete search history.

(56) References Cited

U.S. PATENT DOCUMENTS

| | | |
|---|---|---|
| 2016/0269717 A1 | 9/2016 | Kato |
| 2019/0313070 A1 | 10/2019 | Boujut-Burgun et al. |

\* cited by examiner

DISPARITY IMAGE STITCHING AND VISUALIZATION METHOD BASED ON MULTIPLE PAIRS OF BINOCULAR CAMERAS

TECHNICAL FIELD

The present invention belongs to the field of image processing and computer vision, and particularly relates to a method comprising the steps of calculating a homography matrix between images through external parameters (a rotation vector R and a translation vector T) between cameras, finding an optimal stitching seam between images by graph cut, using R, T, the homography matrix and an optimal transition area to stitch disparity images, and finally fusing the disparity images and visible light images for display.

BACKGROUND

At present, driverless technology is developing rapidly, and safety needs to be ensured for driverless technology. However, by simply using visible light images, it is not possible to well locate an obstacle, obtain the distance of the obstacle, and accurately locate the vehicle of one's own. With the improvement of the technology for obtaining disparity images based on binocular cameras, disparity images are also used as basic data in the field of driverless technology. However, limited by the accuracy of the disparity images, the field angle of the binocular cameras is small, and a single pair of binocular cameras cannot provide sufficient environmental information for the vehicle of one's own. The larger the field angle of a vehicle is, the more complete the information obtained will be, and the higher the guarantee of driving safety will be. In order to make the disparity images have a wider range of field angle, it is necessary to stitch multiple disparity images together. Currently, the following two methods are mainly used for stitching disparity images:

1. Stitching Method Using Feature Points

This method is to extract feature matching points between images, then solve a rotation vector R and a translation vector T between cameras, and finally stitch disparity images according to R and T. The advantages of this method are that the stitching effect is relatively good, the use is flexible, and the method can be used in most scenes; and the disadvantages are that the calculation complexity is high and the method cannot meet the high real-time requirements of driverless technology.

2. Stitching Method Using Camera Calibration

This method is to obtain external parameters R and T between cameras by using checkers, and then stitch disparity images. This method has a small amount of stitching calculation and high real-time performance, but it is easy to produce stitching seams during a disparity image stitching process, which makes the stitching effect poor.

The disparity image stitching process is divided into two processes: camera coordinate transformation and image coordinate transformation. The transformation of a camera coordinate system requires the use of internal parameters K of cameras and external parameters RT between cameras to calculate in a three-dimensional coordinate system; and the transformation of an image coordinate system requires the use of a homography matrix H between camera images and an optimal transition area of visible light images for stitching. An image coordinate system transformation process requires pre-registration, and it takes a lot of time to calculate the external parameters and the homography matrix between cameras by matching feature points. Experiments show that camera angles are fixed, the positional relationship RT between cameras and the internal parameters K of cameras can be calculated by a calibration algorithm, and the homography matrix between two images can be derived through RT and the internal parameters K of cameras, and through the relationship between a global coordinate system and an image coordinate system, so that the feature point matching time is omitted by the prior information. Image registration is completed and solutions are obtained by a graph cut algorithm. As the graph cut algorithm is time-consuming, in order to achieve real-time performance, the images need to be processed layer by layer to reduce the calculation complexity of graph cut. An optimal stitching seam obtained based on the images is used to seamlessly stitch the disparity images after image coordinate system transformation. Finally, disparity image information is superimposed on visible light images to facilitate the observation of the depth information of the environment.

SUMMARY

To overcome the defects in the prior art, the present invention provides a disparity image stitching and visualization method based on multiple pairs of binocular cameras: a homography matrix between images is pre-solved based on the prior information (i.e., the positional relationship R and T between cameras), the traditional graph cut algorithm is improved to increase the efficiency of the graph cut algorithm and then is used for stitching disparity images, and the disparity images are fused with visible light images to make it more convenient to observe the depth of the environment. A stitching process requires image information and depth image information obtained by each binocular camera.

The present invention has the following specific technical solution:

A disparity image stitching and visualization method based on multiple pairs of binocular cameras, comprising the following steps:

Step 1): calibrating internal parameters and external parameters of each binocular camera; the internal parameters K include a focal length focus and optical center coordinates $C_x$, $C_y$; the external parameters include a rotation matrix R and a translation vector T; obtaining a baseline length baseline of each binocular camera by calibration; and obtaining visible light images and disparity images of two binocular cameras;

Step 2): calculating homography matrix: calculating a homography matrix H according to the internal parameters and external parameters of each binocular camera, the placement angle between the cameras, and a scene plane distance d; selecting an appropriate value of d according to actual conditions, with the value range thereof being 8-15 in in general; and the specific steps are as follows:

2-1) Imaging a plane in a scene by two binocular cameras, and assuming that the unit normal vector of the plane in the coordinate system of the first binocular camera is N, and the distance from the plane to the center (coordinate origin) of the first binocular camera (i.e., the scene plane distance) is d, then the plane n is expressed as:

$$N^T C_1 = d \qquad (1)$$

Wherein $C_1$ is the three-dimensional coordinate of a three-dimensional point P in the coordinate system of the first binocular camera, and the coordinate of the three-dimensional point P in the coordinate system of the second binocular camera is $C_2$, then the relationship between $C_1$ and $C_2$ is:

$$C_2 = RC_1 + T \qquad (2)$$

Formula (2) is further expressed as:

$$C_2 = RC_1 + T\frac{1}{d}N^T C_1 = \left(R + T\frac{1}{d}N^T\right)C_1 = H'C_1 \qquad (3)$$

Wherein R and T are respectively a rotation vector and a translation vector from the first binocular camera to the second binocular camera;

2-2) Transforming $C_1$ and $C_2$ in step 2-1) from the internal parameters of the cameras into an image coordinate system:

$$c_1 = K_1 C_1 \qquad (4)$$

$$c_2 = K_2 C_2 \qquad (5)$$

It can be obtained from formulas (3), (4) and (5) that:

$$c_2 = K_1\left(R + T\frac{1}{d}N^T\right)K_2^{-1} c_1 = K_1 H' K_2^{-1} c_1 \qquad (6)$$

Finally, a calculation formula of the homography matrix calculated by the internal parameters and the external parameters is obtained:

$$H = K_1 H' K_2^{-1} = K_1\left(R + T\frac{1}{d}N^T\right)K_2^{-1} \qquad (7)$$

$$H = \begin{bmatrix} a_{11} & a_{12} & a_{13} \\ a_{21} & a_{22} & a_{23} \\ a_{31} & a_{32} & a_{33} \end{bmatrix} \qquad (8)$$

Wherein $c_1$ is a corresponding coordinate of $C_1$ in the coordinate system of an imaging plane, and $c_2$ is a corresponding coordinate of $C_2$ in the coordinate system of the imaging plane; $K_1$ is the internal parameters of the first binocular camera; $K_2$ is the internal parameters of the second binocular camera; and the finally obtained transformation matrix H is a 3*3 matrix, and $a_{11}$-$a_{33}$ represent specific values.

Step 3): using the internal parameters of the binocular cameras and the external parameters between the binocular cameras obtained in step 1) and step 2) to perform camera coordinate system transformation of the disparity images; and the specific steps are as follows:

3-1) Using the internal parameters $K_1$ (i.e., the baseline length $baseline_1$ and the focal length $focus_1$) of the first binocular camera to restore the disparity images to a point cloud in the coordinate system of the first binocular camera, and the calculation formulas of the three-dimensional coordinates $C_1$ ($X_1$, $Y_1$, $Z_1$) of the point cloud are as follows:

$$Z_1 = \frac{baseline_1 * focus_1}{disparity_1} \qquad (9)$$

$$X_1 = \frac{(x_1 - C_x) * baseline_1}{disparity_1} \qquad (10)$$

$$Y_1 = \frac{(y_1 - C_y) * focus_1}{disparity_1} \qquad (11)$$

Wherein $x_1$ and $y_1$ are the pixel coordinates of the first binocular camera; disparity is a disparity value;

3-2) Using the external parameters R and T from the first binocular camera to the second binocular camera to transform the camera coordinate system of the point cloud and obtain the three-dimensional coordinates of the point cloud in the coordinate system of the second binocular camera; and the coordinate transformation formula is as follows:

$$\begin{pmatrix} X_2 \\ Y_2 \\ Z_2 \end{pmatrix} = R\begin{pmatrix} X_1 \\ Y_1 \\ Z_1 \end{pmatrix} + T \qquad (12)$$

3-3) Using the internal parameters $K_2$ (i.e., the baseline length $baseline_2$ and the focal length $focus_2$) of the second binocular camera to restore the point cloud to the disparity images, at this time, only $Z_2$ is needed to calculate the disparity value in the coordinate system of the second binocular camera, and the calculation formula is as follows:

$$disparity_2 = \frac{baseline_2 * focus_2}{Z_2} \qquad (13)$$

Step 4): building overlapping area model: using the homography matrix H between images obtained in step 2) to calculate an overlapping area ROI of images, and modeling the overlapping area; and the specific steps of building a mathematical model are as follows:

4-1) For the pixels of two images in the overlapping area, calculating the second norm of the RGB pixels corresponding to the overlapping area of the two images, and building t-links; the calculation formulas of the second norm are as follows:

$$e(p,q) = \|p - p'\| + \|q - q'\| \qquad (14)$$

$$\|p - p'\| = (R_p - R_{p'})^2 + (G_p - G_{p'})^2 + (B_p - B_{p'})^2 \qquad (15)$$

$$\|q - q'\| = (R_q - R_{q'})^2 + (G_q - G_{q'})^2 + (B_q - B_{q'})^2 \qquad (16)$$

Wherein e(•) is a weight function, p is a source image, q is a target image, p is the pixel value of one point in the image p, p' is the pixel value of a p adjacent point, q is the pixel value of one point in the target image, q' is the pixel value of a q adjacent point, $R_p$ is the value of R channel at p point, $R_{p'}$ is the value of R channel at p' point, $G_p$ is the value of G channel at p point, $G_{p'}$ is the value of G channel at p' point, $B_p$ is the value of B channel at p point, $B_{p'}$ is the value of B channel at p' point, $R_q$ is the value of R channel at q point, $R_{q'}$ is the value of R channel at q' point, $G_q$ is the value of G channel at q point, $G_{q'}$ is the value of G channel at q' point, $B_q$ is the value of B channel at q point, and $B_{q'}$ is the value of B channel at q' point;

4-2) Finding an optimal stitching line for the built model, and solving (the stitching seam) by graph cut; an energy function is defined as:

$$E(f) = \Sigma_{p,q \in N} S_{p,q}(l_p, l_{qi}) + \Sigma_{p \in P} D_p(l_p) \qquad (17)$$

Wherein $S_{p,q}$ is a smoothing term representing the cost of assigning a pair of pixels (p, q) in the overlapping area to ($l_p$, $l_q$), $l_p$ is a label assigned to the pixel p, $l_q$ is a label assigned to the pixel q, and $D_p$ is a data term representing the cost of marking the pixel p in the overlapping area as $l_p$;

Step 5): dividing each image into blocks with a size of $B_1*B_2$, taking the divided blocks as nodes of a graph, performing graph cut to find a local optimal solution, then continuing to divide each node corresponding to an optimal stitching line corresponding to $B_1*B_2$ until a final block size is equal to a pixel value, and finally and approximately finding a global optimal solution by finding the local optimal solution each time;

Step 6): using the homography matrix H to perform image coordinate system transformation of the disparity images; seamlessly stitching the optimal stitching line in step 5); and the specific steps of disparity image stitching are as follows:

6-1) Transforming the disparity image of the first binocular camera into the image coordinate system of the second binocular camera:

$$w \begin{pmatrix} x_2 \\ y_2 \\ 1 \end{pmatrix} = H \begin{pmatrix} x_1 \\ y_1 \\ 1 \end{pmatrix} \quad (18)$$

Wherein $x_1$ and $y_1$ are the coordinates in the image coordinate system of the first binocular camera; $x_2$ and $y_2$ are the coordinates in the image coordinate system of the second binocular camera; and w is a normalization coefficient;

6-2) Stitching image: comparing the positions of the first binocular image after image coordinate system transformation and the second binocular image corresponding to an optimal stitching seam, and merging two visible light images and two disparity images respectively;

When the number of binocular cameras is greater than two, repeating steps 3)-6) to obtain disparity images with a larger field angle.

Step 7): adding the stitched disparity information to the visible light images; and the specific steps are as follows:

7-1) Converting the disparity images to color images, replacing disparity information with color information, and using different colors to represent different depths;

7-2) Superimposing and fusing the color images obtained from the disparity images and the visible light images, and the superposition method is a weighted average method:

Fused image=$k$*visible light image+$(1-k)$*color image    (19)

Wherein k is a weight coefficient.

The present invention has the following beneficial effects: the present invention realizes large-field-angle panoramic disparity image display; the algorithm of the present invention achieves real-time performance, and realizes large-disparity seamless panoramic disparity image stitching and visualization. The present invention has the following advantages: (1) the program has low requirements on memory and hardware, and can achieve real-time performance on Nvidia TX2; (2) the program is simple and easy to implement; (3) after obtained, the prior information can be directly passed in as parameters to be used as default values; (4) the optimal stitching seam obtained from the images is applied to disparity image stitching to achieve seamless stitching; and (5) disparity image information is superimposed on visible light images.

The present invention makes full use of the prior information of the images and reduces the time of image registration. The method proposed has good scalability; panoramic display of multiple pairs of cameras can be realized by simply inputting R, T and internal parameters K of cameras, and manually setting d value; and the disparity image information is superimposed on the visible light images to display the depth information of the environment more intuitively.

DETAILED DESCRIPTION

The present invention proposes a disparity image stitching and visualization method based on multiple pairs of binocular cameras, and will be described in detail below in combination with drawings and embodiments.

Figure 1:
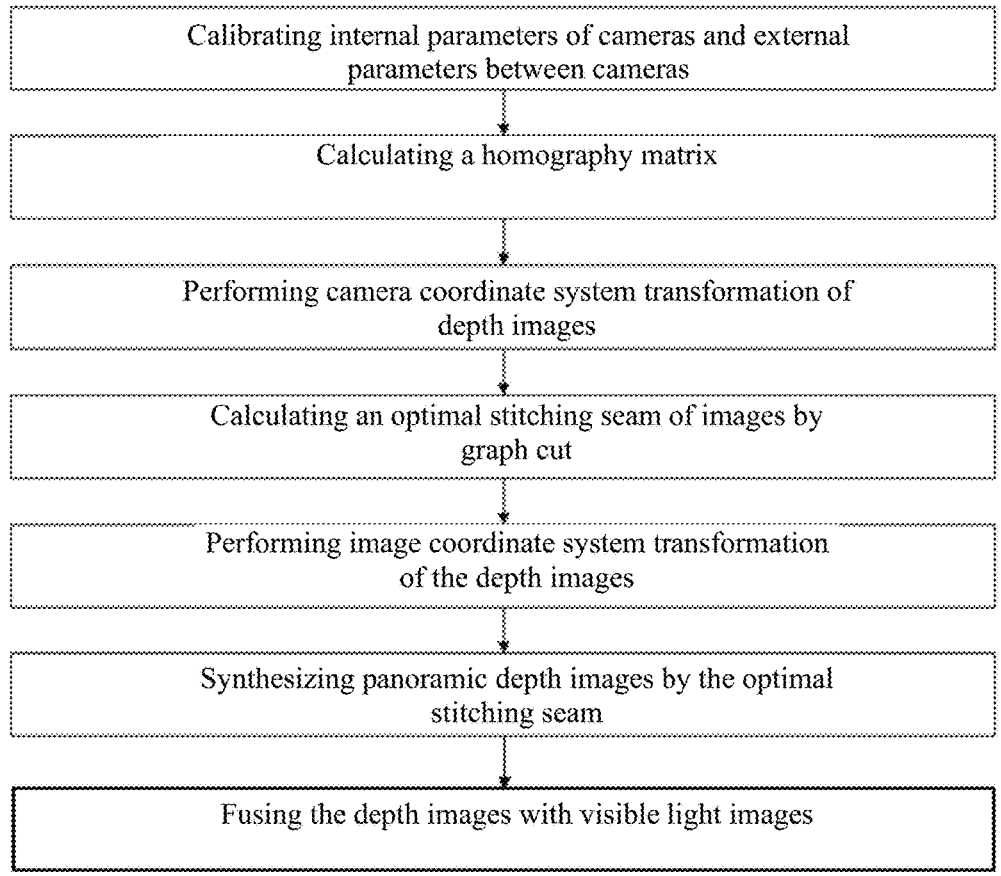
FIG. 1 is a flow chart of the present invention.
Figure 2:
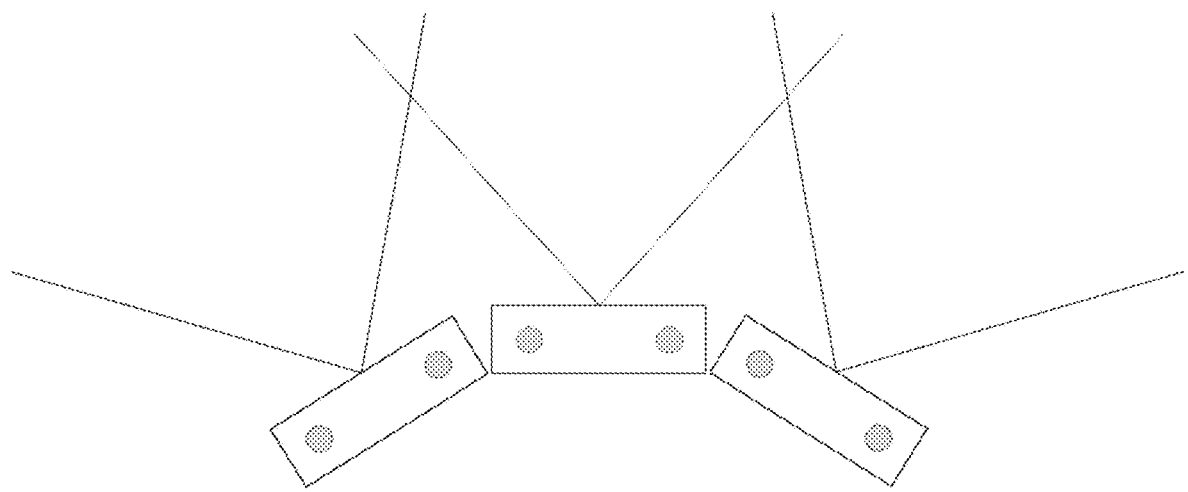
FIG. 2 is a system structure diagram of binocular cameras of an embodiment of the present invention.

The present invention uses multiple pairs of horizontally placed binocular cameras as an imaging system to perform multi-viewpoint image collection, wherein $K_1$ is the internal parameters of the first binocular camera, and $K_2$ is the internal parameters of the second binocular camera. The resolution of each binocular camera is 1024*768, the video frame rate is greater than 20 frames per second, and a system reference structure is shown in FIG. 2. The spatial transformation relationship R and T between each pair of binocular cameras is calculated on this basis, and the homography matrix H between images is calculated through R, T and the distance d of the imaging plane; the horizontal translation of each image is calculated by taking an intermediate image as a benchmark; and finally, the calculated parameters are used as inputs for stitching and visualization. The specific process is as follows:

1) System calibration and data collection 1-1) Calibrating each pair of binocular cameras to obtain the internal parameters including focal length and optical center and the external parameters including rotation and translation of each pair of binocular cameras;

1-2) Connecting each pair of binocular cameras to multiple computers, and using a router to control and conduct synchronous data collection;

1-3) Using special customized calibration boards to collect images at the same time; paying attention to ensure that the positional relationship between the binocular cameras is consistent during the collection process and keep the calibration boards fixed; and rotating the calibration boards to collect 10-15 groups of images for each pair of binocular cameras according to the actual conditions.

2) Calculating homography matrix between image transformations 2-1) Imaging a plane in a scene by two cameras, and assuming that the unit normal vector of the plane in the coordinate system of the first camera is N, and the distance from the plane to the center (coordinate origin) of the first camera is d, then the plane π can be expressed as:

$$N^T C_1 = d$$

Wherein $C_1$ is the coordinate of a three-dimensional point P in the coordinate system of the first camera, $X_1$ and the coordinate of the three-dimensional point P in the coordinate system of the second camera is $C_2$, then the relationship between the two is:

$$C_2 = R * C_1 + T$$

$$C_2 = RC_1 + T\frac{1}{d}N^T C_1 = \left(R + T\frac{1}{d}N^T\right)C_1 = H'C_1$$

2-2) Obtaining the homography matrix obtained in step 2-1) from the coordinate system of the first camera, and the homography matrix needs to be transformed into the coordinate system of the imaging plane:

$$c_1 = K_1 C_1$$

$$c_2 = K_2 C_2$$

$$H = K_1 H' K_2^{-1}$$

The value of d in the above formula can be set manually, and the rest are fixed values. In this way, the homography matrix H from the first binocular camera to the second binocular camera is obtained.

3) Using the internal parameters of the binocular cameras and the external parameters between the binocular cameras obtained in steps 1) and 2) to perform camera coordinate system transformation of the disparity images;

3-1) Using the internal parameters $K_1$, etc. of the first pair of binocular cameras to restore the disparity images to a point cloud in the coordinate system of the first camera:

$$Z_1 = \frac{\text{baseline}_1 * \text{focus}_1}{\text{disparity}_1}$$

$$X_1 = \frac{(x_1 - C_x) * \text{baseline}_1}{\text{disparity}_1}$$

$$Y_1 = \frac{(y_1 - C_y) * \text{focus}_1}{\text{disparity}_1}$$

3-2) Using R and T from the first binocular camera to the second binocular camera to transform the camera coordinate system of the point cloud:

$$\begin{pmatrix} X_2 \\ Y_2 \\ Z_2 \end{pmatrix} = R \begin{pmatrix} X_1 \\ Y_1 \\ Z_1 \end{pmatrix} + T$$

Using the internal parameters $K_2$ of an intermediate viewpoint binocular camera to restore the point cloud to the disparity images, at this time, only $Z_2$ is needed to obtain the disparity images, and the calculation formula is as follows:

$$\text{disparity}_2 = \frac{\text{baseline}_2 * \text{focus}_2}{Z_2}$$

Calculating overlapping area of images and solving optimal stitching seam by modeling: first, calculating an overlapping area ROI through the homography matrix between images, and then building an overlapping area model; and the specific steps are as follows:

4-1) Calculating the size of the overlapping area by the homography matrix between images:

Taking the four vertices (0, 0), (img.cols, 0), (img.cols, img.rows) and (0, img.rows) of an image, calculating the transformed coordinates, the transformed upper left corner coordinate is for the stitched image, and the homography transformation matrix H is:

$$H = \begin{bmatrix} a_{11} & a_{12} & a_{13} \\ a_{21} & a_{22} & a_{23} \\ a_{31} & a_{32} & a_{33} \end{bmatrix}$$

The calculation formulas are:

$$x = \frac{x'}{w'} = \frac{a_{11}u + a_{12}v + a_{13}}{a_{31}u + a_{32}v + a_{33}}$$

$$y = \frac{y'}{w'} = \frac{a_{21}u + a_{22}u + a_{23}}{a_{31}u + a_{32}u + a_{33}}$$

Wherein x is the x-coordinate of the source image p point after perspective transformation, y is the y-coordinate of the source image p point after perspective transformation, u is the x-coordinate of the source image p point, and v is the y-coordinate of the source image p point;

4-2) Building an energy model (seam-driven image stitching), and constructing an energy function of a graph cut algorithm:

$$E(1) = \sum_{p \in P} D_p(l_p) + \sum_{(p,q) \in N} S_{p,q}(l_p, l_q)$$

Wherein the data term $D_p(l_p)$ represents the assigned value of pixel p in the overlapping area:

$$\begin{cases} D_p(1) = 0 \ D_p(0) = \mu & \text{if } p \in \partial I_0 \cap \partial P \\ D_p(0) = 0 \ D_p(1) = \mu & \text{if } p \in \partial I_1 \cap \partial P \\ D_p(0) = D_p(1) = 0 & \text{otherwise} \end{cases}$$

In order to avoid marking errors, pi is set to be a very large number;

$S_{p,q}(l_p, l_q)$ is a smoothing term;

$$S_{p,q}(l_p, l_q) = I_*(p) + I_*(q)$$

$$I_*(p) = \|I_0(\cdot) - I_1(\cdot)\|_2$$

5) After the model is built, obtaining a solution by graph cut, and the result is an optimal stitching seam. It can be known that the construction of the energy function is very important for the result of the stitching seam.

5-1) As the operation time of graph cut is related to the number of nodes in a graph, and the algorithm complexity is relatively high, only by down-sampling or stratifying the overlapping area to reduce the number of nodes in the constructed graph, and making the local optimal solution obtained by this method be approximately equal to the global optimal solution, can the real-time performance of the algorithm meet requirements.

5-2) In addition, the parallelization of the graph cut algorithm can also achieve a further acceleration effect. (Fast graphcut on GPU CVPR2008) 6) The specific steps of disparity image stitching are as follows:

6-1) Transforming the depth image of the first binocular camera into the image coordinate system of the second binocular camera:

$$W\begin{pmatrix}x_2\\y_2\\1\end{pmatrix}=H\begin{pmatrix}x_1\\y_1\\1\end{pmatrix}$$

6-2) Stitching image: comparing the positions of the disparity image after image coordinate system transformation and an intermediate disparity image corresponding to the optimal stitching seam, and merging the two disparity images.

Completing the disparity image stitching of one pair of binocular cameras by steps 1)-6), and repeating steps 1)-6) to complete the disparity image stitching of the second pair of binocular cameras (e.g., the second and third binocular cameras).

7) Adding the stitched disparity information to the visible light images:

7-1) Converting the disparity images to color images, replacing disparity information with color information, and using different colors to represent different depths, wherein the color images calculated from the disparity images includes but is not limited to pseudo-color images and rainbow images;

7-2) Superimposing and fusing the color images obtained from the disparity images and the visible light images, and the superposition method is a weighted average method:

Fused image=$k$*visible light image+$(1-k)$*color image k is a weight coefficient; when k is relatively large (1-*0.5), visible light information can be observed more clearly; and when k is relatively small (0.5-0), more depth information can be observed.

The invention claimed is:

1. A disparity image stitching and visualization method based on multiple pairs of binocular cameras, comprising the following steps:
step 1): calibrating internal parameters and external parameters of each binocular camera; the internal parameters K include a focal length focus and optical center coordinates $C_x$, $C_y$; the external parameters include a rotation matrix R and a translation vector T; obtaining a baseline length baseline of each binocular camera by calibration; and obtaining visible light images and disparity images of two binocular cameras;
step 2): calculating homography matrix: calculating a homography matrix H according to the internal parameters and external parameters of each binocular camera, the placement angle between the cameras, and a scene plane distance d; and the value range of d is 8-15 m;
step 3): using the internal parameters of the binocular cameras and the external parameters between the binocular cameras obtained in step 1) and step 2) to perform camera coordinate system transformation of the disparity images;
step 4): building overlapping area model: using the homography matrix H between images obtained in step 2) to calculate an overlapping area ROI of images, and modeling the overlapping area;
step 5): dividing each image into blocks with a size of $B_1$*$B_2$, taking the divided blocks as nodes of a graph, performing graph cut to find a local optimal solution, then continuing to divide each node corresponding to an optimal stitching line corresponding to $B_1$*$B_2$ until a final block size is equal to a pixel value, and finally and approximately finding a global optimal solution by finding the local optimal solution each time;
step 6): using the homography matrix H to perform image coordinate system transformation of the disparity images; seamlessly stitching the optimal stitching line in step 5); when the number of binocular cameras is greater than two, repeating steps 3)-6) to obtain disparity images with a larger field angle; and
step 7): adding the stitched disparity information to the visible light images.

2. The disparity image stitching and visualization method based on multiple pairs of binocular cameras according to claim 1, wherein the specific steps of calculating homography matrix described in step 2) are as follows:
2-1) imaging a plane in a scene by two binocular cameras, and assuming that the unit normal vector of the plane in the coordinate system of the first binocular camera is N, and the distance from the plane to the center of the first binocular camera (i.e., the scene plane distance) is d, then the plane 7C is expressed as:

$$N^T C_1 = d \quad (1)$$

wherein $C_1$ is the three-dimensional coordinate of a three-dimensional point P in the coordinate system of the first binocular camera, and the coordinate of the three-dimensional point P in the coordinate system of the second binocular camera is $C_2$, then the relationship between $C_1$ and $C_2$ is:

$$C_2 = RC_1 + T \quad (2)$$

formula (2) is further expressed as:

$$C_2 = RC_1 + T\frac{1}{d}N^T C_1 = \left(R + T\frac{1}{d}N^T\right)C_1 = H' C_1 \quad (3)$$

wherein R and T are respectively a rotation vector and a translation vector from the first binocular camera to the second binocular camera;
2-2) transforming $C_1$ and $C_2$ in step 2-1) from the internal parameters of the cameras into the image coordinate system:

$$c_1 = K_1 C_1 \quad (4)$$

$$c_2 = K_2 C_2 \quad (5)$$

it can be obtained from formulas (3), (4) and (5) that:

$$c_2 = K_1\left(R + T\frac{1}{d}N^T\right)K_2^{-1}c_1 = K_1 H' K_2^{-1} c_1 \quad (6)$$

finally, a calculation formula of the homography matrix calculated by the internal parameters and the external parameters is obtained:

$$H = K_1 H' K_2^{-1} = K_1\left(R + T\frac{1}{d}N^T\right)K_2^{-1} \quad (7)$$

$$H = \begin{bmatrix} a_{11} & a_{12} & a_{13} \\ a_{21} & a_{22} & a_{23} \\ a_{31} & a_{32} & a_{33} \end{bmatrix} \quad (8)$$

wherein $c_1$ is a corresponding coordinate of $C_1$ in the coordinate system of an imaging plane, and $c_2$ is a corresponding coordinate of $C_2$ in the coordinate system of the imaging plane;

$K_1$ is the internal parameters of the first binocular camera; $K_2$ is the internal parameters of the second binocular camera; and the finally obtained transformation matrix H is a 3*3 matrix, and $a_{11}$-$a_{33}$ represent specific values.

3. A disparity image stitching and visualization method based on multiple pairs of binocular cameras according to claim 1, wherein the specific steps of step 3) are as follows:

3-1) using the internal parameters $K_1$ (i.e., the baseline length $baseline_1$ and the focal length $focus_1$) of the first binocular camera to restore the disparity images to a point cloud in the coordinate system of the first binocular camera, and the calculation formulas of the three-dimensional coordinates $C_1$ ($X_1, Y_1, Z_1$) of the point cloud are as follows:

$$Z_1 = \frac{baseline_1 * focus_1}{disparity_1} \tag{9}$$

$$X_1 = \frac{(x_1 - C_x) * baseline_1}{disparity_1} \tag{10}$$

$$Y_1 = \frac{(y_1 - C_y) * focus_1}{disparity_1} \tag{11}$$

wherein $x_1$ and $y_1$ are the pixel coordinates of the first binocular camera; disparity is a disparity value;

3-2) using the external parameters R and T from the first binocular camera to the second binocular camera to transform the camera coordinate system of the point cloud and obtain the three-dimensional coordinates of the point cloud in the coordinate system of the second binocular camera; and the coordinate transformation formula is as follows:

$$\begin{pmatrix} X_2 \\ Y_2 \\ Z_2 \end{pmatrix} = R \begin{pmatrix} X_1 \\ Y_1 \\ Z_1 \end{pmatrix} + T \tag{12}$$

3-3) using the internal parameters $K_2$ (i.e., the baseline length $baseline_2$ and the focal length $focus_2$) of the second binocular camera to restore the point cloud to the disparity images, at this time, only $Z_2$ is needed to calculate the disparity value in the coordinate system of the second binocular camera, and the calculation formula is as follows:

$$disparity_2 = \frac{baseline_2 * focus_2}{Z_2}. \tag{13}$$

4. The disparity image stitching and visualization method based on multiple pairs of binocular cameras according to claim 1, wherein the specific steps of building overlapping area model described in step 4) are as follows:

4-1) for the pixels of two images in the overlapping area, calculating the second norm of the RGB pixels corresponding to the overlapping area of the two images, and building t-links; the calculation formulas of the second norm are as follows:

$$e(p,q) = \|p - p'\| + \|q - q'\| \tag{14}$$

$$\|p-p'\| = (R_p - R_{p'})^2 + (G_p - G_{p'})^2 + (B_p - B_{p'})^2 \tag{15}$$

$$\|q-q'\| = (R_q - R_{q'})^2 + (G_q - G_{q'})^2 + (B_q - B_{q'})^2 \tag{16}$$

Wherein $e(\bullet)$ is a weight function, p is a source image, q is a target image, p is the pixel value of one point in the image p, p' is the pixel value of a p adjacent point, q is the pixel value of one point in the target image, q' is the pixel value of a q adjacent point, $R_p$ is the value of R channel at p point, $R_{p'}$ is the value of R channel at p' point, $G_p$ is the value of G channel at p point, $G_{p'}$ is the value of G channel at p' point, $B_p$ is the value of B channel at p point, $B_{p'}$ is the value of B channel at p' point, $R_q$ is the value of R channel at q point, $R_{q'}$ is the value of R channel at q' point, $G_q$ is the value of G channel at q point, $G_{q'}$ is the value of G channel at q' point, $B_q$ is the value of B channel at q point, and $B_{q'}$ is the value of B channel at q' point;

4-2) Finding an optimal stitching line for the built model, and solving (the stitching seam) by graph cut; an energy function is defined as:

$$E(f) = \Sigma_{p,q \in N} S_{p,q}(l_p, l_{qi}) + \Sigma_{p \in P} D_p(l_p) \tag{17}$$

wherein $S_{p,q}$ is a smoothing term representing the cost of assigning a pair of pixels (p, q) in the overlapping area to ($l_p, l_q$), $l_p$ is a label assigned to the pixel p, $l_q$ is a label assigned to the pixel q, and $D_p$ is a data term representing the cost of marking the pixel p in the overlapping area as $l_p$.

5. The disparity image stitching and visualization method based on multiple pairs of binocular cameras according to claim 3, wherein the specific steps of building overlapping area model described in step 4) are as follows:

4-1) for the pixels of two images in the overlapping area, calculating the second norm of the RGB pixels corresponding to the overlapping area of the two images, and building t-links; the calculation formulas of the second norm are as follows:

$$e(p,q) = \|p - p'\| + \|q - q'\| \tag{14}$$

$$\|p-p'\| = (R_p - R_{p'})^2 + (G_p - G_{p'})^2 + (B_p - B_{p'})^2 \tag{15}$$

$$\|q-q'\| = (R_q - R_{q'})^2 + (G_q - G_{q'})^2 + (B_q - B_{q'})^2 \tag{16}$$

Wherein $e(\bullet)$ is a weight function, p is a source image, q is a target image, p is the pixel value of one point in the image p, p' is the pixel value of a p adjacent point, q is the pixel value of one point in the target image, q' is the pixel value of a q adjacent point, $R_p$ is the value of R channel at p point, $R_{p'}$ is the value of R channel at p' point, $G_p$ is the value of G channel at p point, $G_{p'}$ is the value of G channel at p' point, $B_p$ is the value of B channel at p point, $B_{p'}$ is the value of B channel at p' point, $R_q$ is the value of R channel at q point, $R_{q'}$ is the value of R channel at q' point, $G_q$ is the value of G channel at q point, $G_{q'}$ is the value of G channel at q' point, $B_q$ is the value of B channel at q point, and $B_{q'}$ is the value of B channel at q' point;

4-2) Finding an optimal stitching line for the built model, and solving (the stitching seam) by graph cut; an energy function is defined as:

$$E(f) = \Sigma_{p,q \in N} S_{p,q}(l_p, l_{qi}) + \Sigma_{p \in P} D_p(l_p) \tag{17}$$

wherein $S_{p,q}$ is a smoothing term representing the cost of assigning a pair of pixels (p, q) in the overlapping area to ($l_p, l_q$), $l_p$ is a label assigned to the pixel p, $l_q$ is a label assigned to the pixel q, and Dp is a data term representing the cost of marking the pixel p in the overlapping area as $l_p$.

6. The disparity image stitching and visualization method based on multiple pairs of binocular cameras according to claim 1, wherein the specific steps of disparity image stitching described in step 6) are as follows:
   6-1) transforming the disparity image of the first binocular camera into the image coordinate system of the second binocular camera:

$$W \begin{pmatrix} x_2 \\ y_2 \\ 1 \end{pmatrix} = H \begin{pmatrix} x_1 \\ y_1 \\ 1 \end{pmatrix} \quad (18)$$

wherein $x_1$ and $y_1$ are the coordinates in the image coordinate system of the first binocular camera; $x_2$ and $y_2$ are the coordinates in the image coordinate system of the second binocular camera; and w is a normalization coefficient;
   6-2) stitching image: comparing the positions of the first binocular image after image coordinate system transformation and the second binocular image corresponding to an optimal stitching seam, and merging two visible light images and two disparity images respectively.

7. The disparity image stitching and visualization method based on multiple pairs of binocular cameras according to claim 3, wherein the specific steps of disparity image stitching described in step 6) are as follows:
   6-1) transforming the disparity image of the first binocular camera into the image coordinate system of the second binocular camera:

$$W \begin{pmatrix} x_2 \\ y_2 \\ 1 \end{pmatrix} = H \begin{pmatrix} x_1 \\ y_1 \\ 1 \end{pmatrix} \quad (18)$$

wherein $x_1$ and $y_1$ are the coordinates in the image coordinate system of the first binocular camera; $x_2$ and $y_2$ are the coordinates in the image coordinate system of the second binocular camera; and w is a normalization coefficient;
   6-2) stitching image: comparing the positions of the first binocular image after image coordinate system transformation and the second binocular image corresponding to an optimal stitching seam, and merging two visible light images and two disparity images respectively.

8. The disparity image stitching and visualization method based on multiple pairs of binocular cameras according to claim 4, wherein the specific steps of disparity image stitching described in step 6) are as follows:
   6-1) transforming the disparity image of the first binocular camera into the image coordinate system of the second binocular camera:

$$W \begin{pmatrix} x_2 \\ y_2 \\ 1 \end{pmatrix} = H \begin{pmatrix} x_1 \\ y_1 \\ 1 \end{pmatrix} \quad (18)$$

wherein $x_1$ and $y_1$ are the coordinates in the image coordinate system of the first binocular camera; $x_2$ and $y_2$ are the coordinates in the image coordinate system of the second binocular camera; and w is a normalization coefficient;
   6-2) stitching image: comparing the positions of the first binocular image after image coordinate system transformation and the second binocular image corresponding to an optimal stitching seam, and merging two visible light images and two disparity images respectively.

9. The disparity image stitching and visualization method based on multiple pairs of binocular cameras according to claim 1, 2, 5, 7 or 8, wherein the specific steps of step 7) are as follows:
   7-1) converting the disparity images to color images, replacing disparity information with color information, and using different colors to represent different depths;
   7-2) superimposing and fusing the color images obtained from the disparity images and the visible light images, and the superposition method is a weighted average method:

Fused image=$k$*visible light image+$(1-k)$*color image  (19)

wherein k is a weight coefficient.

10. The disparity image stitching and visualization method based on multiple pairs of binocular cameras according to claim 6, wherein the specific steps of step 7) are as follows:
    7-1) converting the disparity images to color images, replacing disparity information with color information, and using different colors to represent different depths;
    7-2) superimposing and fusing the color images obtained from the disparity images and the visible light images, and the superposition method is a weighted average method:

Fused image=$k$*visible light image+$(1-k)$*color image  (19)

wherein k is a weight coefficient.

* * * * *